(12) United States Patent
Arellano et al.

(10) Patent No.: US 10,769,875 B2
(45) Date of Patent: Sep. 8, 2020

(54) SYSTEM FOR SECURING DELIVERED PACKAGES

(71) Applicants: Marc T. Arellano, Albuquerque, NM (US); Luis M. Ortiz, Albuquerque, NM (US); Thomas Romero, Las Cruces, NM (US)

(72) Inventors: Marc T. Arellano, Albuquerque, NM (US); Luis M. Ortiz, Albuquerque, NM (US); Thomas Romero, Las Cruces, NM (US)

( * ) Notice: Subject to any disclaimer, the term of this patent is extended or adjusted under 35 U.S.C. 154(b) by 68 days.

(21) Appl. No.: 15/915,603

(22) Filed: Mar. 8, 2018

(65) Prior Publication Data

US 2018/0261030 A1    Sep. 13, 2018

Related U.S. Application Data

(60) Provisional application No. 62/468,609, filed on Mar. 8, 2017.

(51) Int. Cl.
| | |
|---|---|
| *H04N 7/18* | (2006.01) |
| *G07C 9/00* | (2020.01) |
| *G06Q 10/08* | (2012.01) |
| *G08B 13/196* | (2006.01) |
| *A47G 29/14* | (2006.01) |
| *G08B 13/12* | (2006.01) |

(52) U.S. Cl.
CPC ....... *G07C 9/00896* (2013.01); *A47G 29/141* (2013.01); *G06Q 10/0836* (2013.01); *G08B 13/126* (2013.01); *G08B 13/196* (2013.01); *H04N 7/183* (2013.01); *H04N 7/188* (2013.01); *A47G 2029/149* (2013.01); *G07C 9/0069* (2013.01); *G07C 9/00563* (2013.01); *G07C 9/00571* (2013.01); *G07C 9/00912* (2013.01); *G07C 2009/0092* (2013.01); *G07C 2009/00769* (2013.01)

(58) Field of Classification Search
None
See application file for complete search history.

(56) References Cited

U.S. PATENT DOCUMENTS

| | | | | |
|---|---|---|---|---|
| 2011/0074570 A1* | 3/2011 | Feldstein | ............ | H04L 12/2825 340/539.11 |
| 2011/0212683 A1* | 9/2011 | Ortiz | ............ | H04W 56/00 455/3.06 |
| 2014/0232861 A1* | 8/2014 | Naidoo | ............ | H04N 7/18 348/143 |
| 2016/0307380 A1* | 10/2016 | Ho | | |

* cited by examiner

*Primary Examiner* — Edemio Navas, Jr.
(74) *Attorney, Agent, or Firm* — Ortiz & Lopez, PLLC

(57) ABSTRACT

A system for use to secure delivered packages can include a box, at least one electromechanically operated security door securing access to the box and a control panel for receiving input to release the electromechanically secured door from the box. Communications components, alarms and cameras can also be associated with the box to facilitate its security and operation for package receipt (delivery) and security.

20 Claims, 3 Drawing Sheets

SYSTEM FOR SECURING DELIVERED PACKAGES

INVENTION PRIORITY

This nonprovisional patent application claims the benefit under 35 U.S.C. § 119(e) to U.S. Provisional Patent Application Ser. No. 62/468,609 filed on Mar. 8, 2017, entitled "SYSTEM FOR SECURING DELIVERED PACKAGES" and which is hereby incorporated by reference in its entirety.

TECHNICAL FIELD

The embodiments are generally related to the delivery of packages. More particularly, embodiments of the invention are related to systems for securing delivered packages.

BACKGROUND

The trend of packages left on doorsteps being stolen continues to exponentially rise across the country. Delivery services such as FEDEX, DHL, and UPS often leave packages at front door steps of homes for the intended recipient to retrieve. The typical routine is for a doorbell to be rang, or the front door knocked, and then for the package to be left by the front doorway for the customer, regardless of whether the customer is home or not. This is a problem. This is why packages are being stolen. There is no way for packages to be secured from theft, weather damage, or the curiosity of animals.

An emerging issue associated with package delivery, as it has now become mainstream, is with the security and protection of delivered packages. As on-line shopping continues to rise, the theft or damage of unattended packages will continue to rise. Packages continue to be left near front doorways. Unless there is a recipient waiting to receive the package, it will typically sit in the open where it is unsecured and subject to damage from weather or interference from pets or other animals. What is needed is a system that can secure packages delivered by package delivery services.

SUMMARY OF THE EMBODIMENTS

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

The only way to prevent package theft is to increase the physical security efforts over packages at the time of delivery. It is a feature of the disclosed embodiments to provide a system for use to receive and also to secure delivered packages. Accordingly, a housing provided in the form of a box is provided with an electromechanically secured and/or operated security door that can control access to the contents inside the housing.

It is yet another feature of the disclosed embodiments to provide a control panel in association with the housing including a user interface for authorized user to interact with the system and provide a pin number, biometric, or wireless code (e.g., from a smartphone, tablet, or RFID tag) to unlock the security door associated with the housing and allow the authorized user to access packages stored inside the housing.

It is another feature of the disclosed embodiments to provide a notification message to package recipients when a package has been delivered to the system. Notification can be via a data network (e.g., WiFi, Cellular) using SMS or email as delivery notifications.

It is another feature of the disclosed embodiments that package delivery can be sensed using sensors or indicated based on user access to the system via the control panel. When sensed, a notification message can be sent to registered recipients.

It is yet another feature of the disclosed embodiments for electromechanical and communication components associated with the housing to be powered by a solar-powered and battery recharging source.

It is yet another feature of the disclosed embodiments for electromechanical components to include a locking-unlocking mechanism for the door.

It is yet another feature of the disclosed embodiments for electromechanical components to include a locking-unlocking mechanism for the door that can be actuated by at least one of: a key, RFID tag, smartpbone/tablet computer, a biometric provided to a biometric reader, and a signal provided via wired or wireless signal to communication components associated with the housing.

It is yet another feature of the disclosed embodiments for the housing to include a security alarm to protect the housing and any packages contained therein from tampering or theft.

It is yet another feature of the disclosed embodiments for the housing to include a security alarm to protect the housing and any packages contained therein from tampering or theft by communicating any anomalies to a remote security monitoring service or system.

It is yet another feature of the disclosed embodiments for the housing to include a 360-degree security camera to monitor, record, and/or transmit activity near the housing.

It is yet another feature of the disclosed embodiments for the housing to include a 360 degree security camera to monitor, record, and/or transmit activity near the housing in response to an alarm or detection of activity near the housing via sensors (e.g., motion, tampering, or thermal sensors).

DRAWINGS

The accompanying figures, in which like reference numerals refer to identical or functionally similar elements throughout the separate views and which are incorporated in and form a part of the specification, further illustrate the disclosed embodiments and, together with the detailed description of the invention, serve to explain the principles of the disclosed embodiments.

DETAILED DESCRIPTION OF THE EMBODIMENTS

Figure 1:
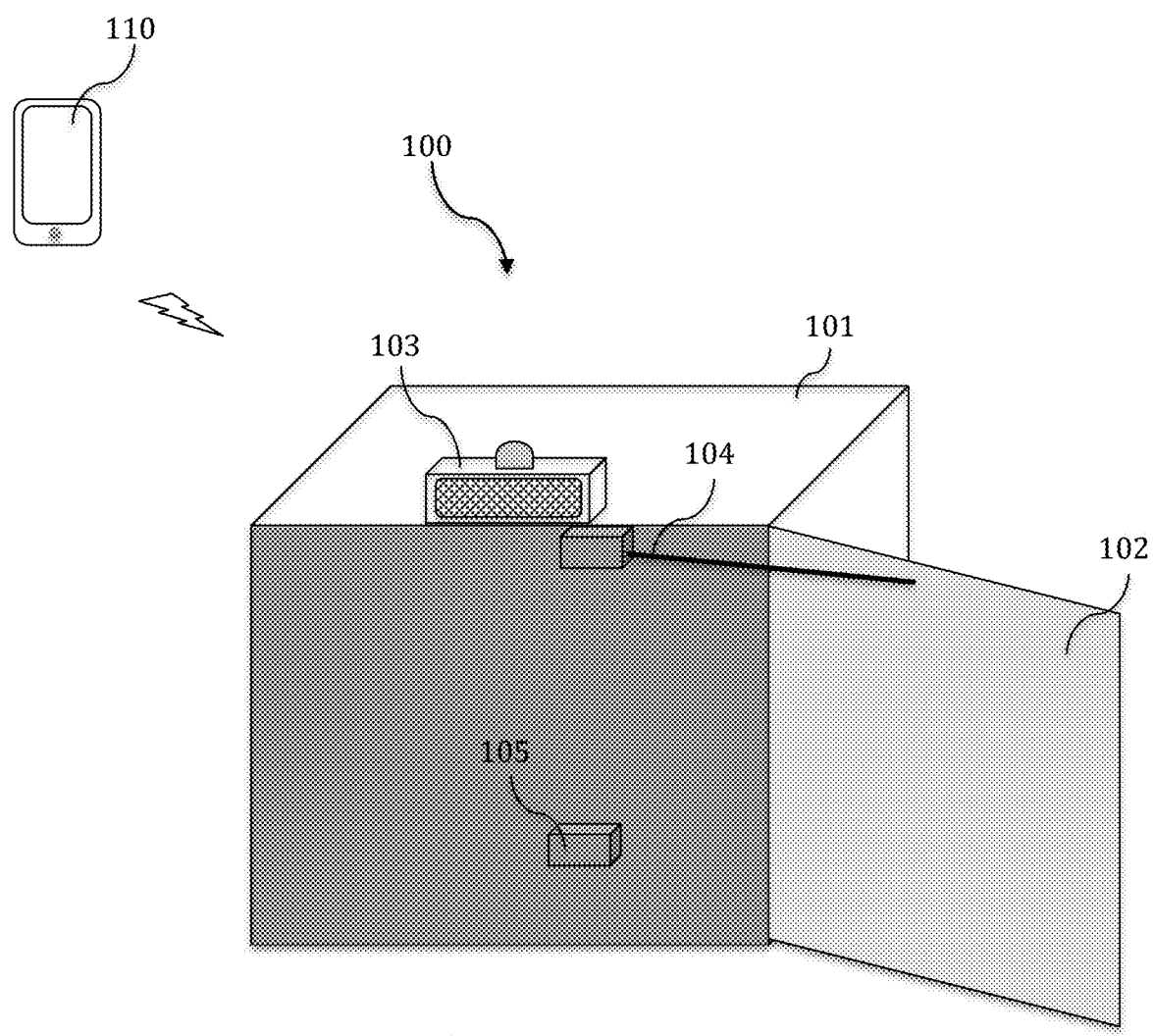
FIG. 1 illustrates a system for securing delivered packages, in accordance with features of the embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" or "at least one" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units, and/or circuits have not been described in detail so as not to obscure the discussion.

Discussions herein utilizing terms such as, for example, "processing," "computing," "calculating" "determining," "establishing," "analyzing," "checking," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality," as used herein, include, for example, "multiple" or "two or more." For example, "a plurality of items" includes two or more items.

References to "one embodiment," "an example embodiment," "an embodiment," "demonstrative embodiment," "various embodiments," etc., indicate that the embodiment(s) so described may include a particular feature, structure, or characteristic, but not every embodiment necessarily includes the particular feature structure, or characteristic. Further, repeated use of the phrase "in one embodiment" does not necessarily refer to the same embodiment, although it may.

As used herein, unless otherwise specified, the use of the ordinal adjectives "first," "second," "third," etc., to describe a common object, merely indicate that different instances of like objects are being referred to and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a Smartphone device, a smartwatch, an RFID tag, wearable computing devices, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a cellular network, a cellular node, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, cell terminals, and the like.

Note that the term "server" as utilized herein refers generally to a computer that provides data to other computers. Such a server can serve data to systems on, for example, a LAN (Local Area Network) or a wide area network (WAN) over the Internet. Many types of servers exist, including web servers, mail servers, and files servers. Each type can run software specific to the purpose of the server. For example, a Web server may run Apache HTTP Server or Microsoft IIS, which both provide access to websites over the Internet. A mail server may run a program such as, for example, Exim or iMail, which can provide SMPT services for sending and receiving email. A file server might utilize, for example, Samba or the operating system's built-in file sharing services to share files over a network. A server is thus a computer or device on a network that manages resources. Other examples of servers include print servers, database servers, and so on. A server may be dedicated, meaning that it performs no other tasks besides their server tasks. On multiprocessing operating systems, however, a single computer can execute several programs at once. A server in this case may refer to the program that is managing resources rather than the entire computer.

Some embodiments may be used in conjunction with devices and/or networks operating in accordance with existing Long Term Evolution (LTE) specifications, e.g., "3GPP TS 36.304 3rd Generation Partnership Project; Technical Specification Group Radio Access Network; Evolved Universal Terrestrial Radio Access (E-UTRA); User Equipment (UE) procedures in idle mode"; "3GPP TS 36.331 3rd Generation Partnership Project; Technical Specification Group Radio Access Network; Evolved Universal Terrestrial Radio Access (E-UTRA); Radio Resource Control (RRC); Protocol specification"; "3GPP 24.312 3rd Generation Partnership Project; Technical Specification Group Core Network and Terminals; Access Network Discovery and Selection. Function (ANDSF) Management Object (MO)"; and/or future versions and/or derivatives thereof, units and/or devices which are part of the above networks, and the like.

Some embodiments may be used in conjunction with one, or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TOMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee®, Ultra-Wideband (UWB), Global System for Mobile communication (GSM), second generation (2G), 2.5G, 3G, 3.5G, 4G, 5G, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1.times.RTT), Evolution-Data Optimized (EV-DO), Enhanced Data rates for GSM Evolution (EDGE), and the like. Other embodiments may be used in various other devices, systems, and/or networks.

The phrase "hand held device" and/or "wireless device" and/or "mobile device" and/or "portable device," as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the phrase "wireless device" and/or "mobile device" may optionally include a wireless service and may also refer to wearable computing devices such as smartwatches.

A "hand held device" or HHD is a type of mobile device or wireless device, which can be held in one's hand during use, such as a smartphone, personal digital assistant (PDA), tablet computing device, laptop computer, and the like. It can be appreciated that such devices are not hand held devices and do not constitute an HHD since they are not used as "hand held devices," but as other types of computing devices, such as wearable computing devices. The example embodiments herein primarily describe methods and systems involving hand held devices. It can be appreciated, however, that other mobile devices such as wearable computing devices can be utilized in place of a hand held device (wearable devices are not "hand held devices" because they are not intended to be used in a user's hands, but instead worn by the user) or may be utilized with other hand held devices. For example, venue-based data as discussed herein can be streamed not only to hand held devices, but also to other mobile computing devices such as wearable computing devices.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments are described herein with respect to a LTE cellular system. However, other embodiments may be implemented in any other suitable cellular network, e.g., a 3G cellular network, a 4G cellular network, a 5G cellular network, a WiMax cellular network, and the like.

The term "antenna", as used herein, may include any suitable configuration, structure and/or arrangement of one or more antenna elements, components, units, assemblies, and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The terms "cell" or "cellular" as used herein, may include a combination of network resources, for example, downlink and optionally uplink resources. The resources may be controlled and/or allocated, for example, by a cellular node (also referred to as a "base station") or the like. The linking between a carrier frequency of the downlink resources and a carrier frequency of the uplink resources may be indicated, for example, in system information transmitted on the downlink resources.

Access points, which are often interconnected by cabling, generally play a dominant role in providing radio frequency (RF) coverage in most wireless LAN (WLAN) deployments. Wireless repeaters, though, are an alternative way to extend the range of an existing WLAN instead of adding more access points. There are very few stand-alone 802.11 wireless repeaters on the market but some access points have a built-in repeater mode. The wireless communications electronics representing access points and wireless repeaters will be referred to herein as communications system nodes or simply as communications nodes.

In general, a repeater simply regenerates a network signal in order to extend the range of the existing network infrastructure. A WLAN repeater does not physically connect by wire to any part of the network. Instead, it receives radio signals (802.11 frames) from an access point, end user device, or another repeater and retransmits the frames. This makes it possible for a repeater located in between an access point and distant user to act as a relay for frames traveling back and forth between the user and the access point.

Referring to FIG. 1, a system for securing delivered package 100 in accordance with features of the embodiments is illustrated. A system 100 is uniquely adapted for receiving and securing packages delivered by services such as UPS, FEDEX, and DHL, or any other services that may become involved in package delivery. At a minimum, it is preferred that a system 100 include a housing 101, at least one electromechanically locked door 102, and a control panel 103. The housing 101 will ideally be designed in the form of a box as shown in FIG. 1 that includes at least four panels and an electronically lockable door 102 to secure any contents placed therein from weather and theft. The housing 101 and door 102 can be made of any material that will fulfill the need for protection from weather and theft, including steel, aluminum, plastic, wood, composite materials, or any combination.

The control panel 103 can be provided to manage control of the electromechanically locked door 102. Components 105 associated with the control panel 103 can be located within the housing. The system control unit 103 is shown located outside of the housing 101 for exemplary purposes only. The control panel 103 can also serve as the locking-unlocking mechanism for the door 102 (or doors) when co-located near the opening of the housing 101 near the door 102. Components associated with the control panel can include communications components to enable wireless communication with users to include SMS/email messaging to owners of the system 101 or messages to authorized delivery personnel located near the housing 101 to retrieve a temporary code for accessing the housing 101. The door 102 can be electromechanically operated by door hardware 104. Door hardware 104 can be provided to facilitate electromechanical opening and closing of the door 102 and can include a rod, bar, track, rail, telescoping system, arms, or any other means to facilitate the opening and closing of doors from a housing. Electromechanical operation of door hardware 104 in association with the door 102 can be by one or any combination of electromechanical, pneumatic, hydraulic, electromagnetic system. Door hardware 104 can also include an electromagnetic or eletromechanical locking and unlocking mechanism operated in association with the control panel 103.

Figure 2:
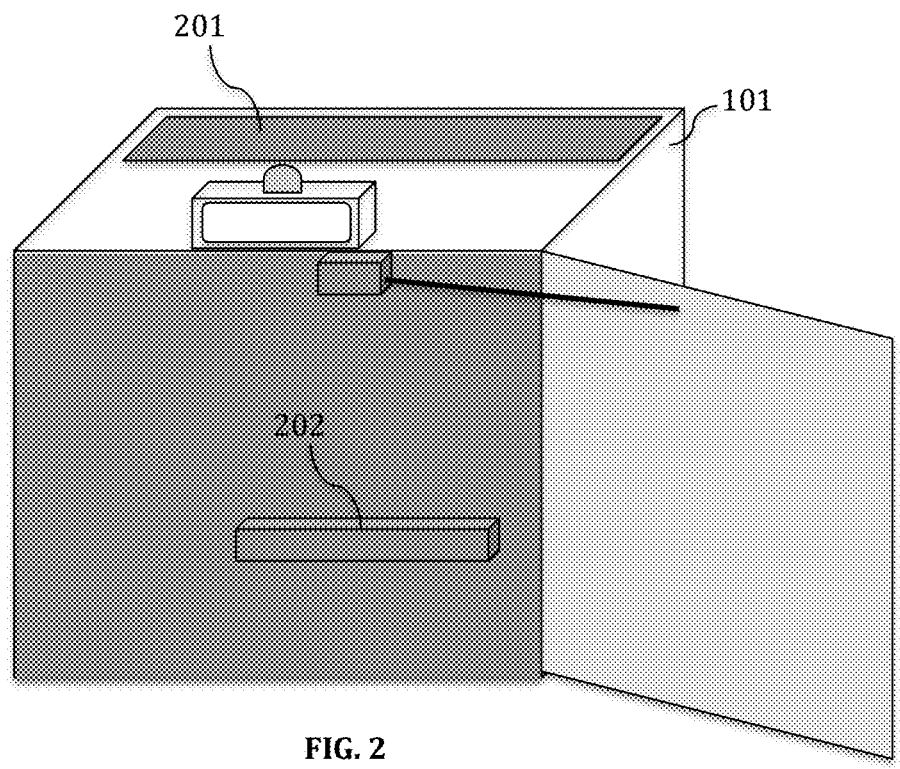
FIG. 2 illustrates a system for securing delivered packages including solar power, in accordance with additional features of the embodiments.

Referring to FIG. 2, illustrated is a system in accordance with features of the embodiments that includes a solar panel 201 and rechargeable batteries 202. In placements or field deployments where power and communications connections are not feasible or possible, it would be desirable to provide solar power capabilities. A solar panel can be mounted to the top surface of the housing 101 while batteries 202 (including charging control circuitry) can be located within the housing 101, as shown.

Figure 3:
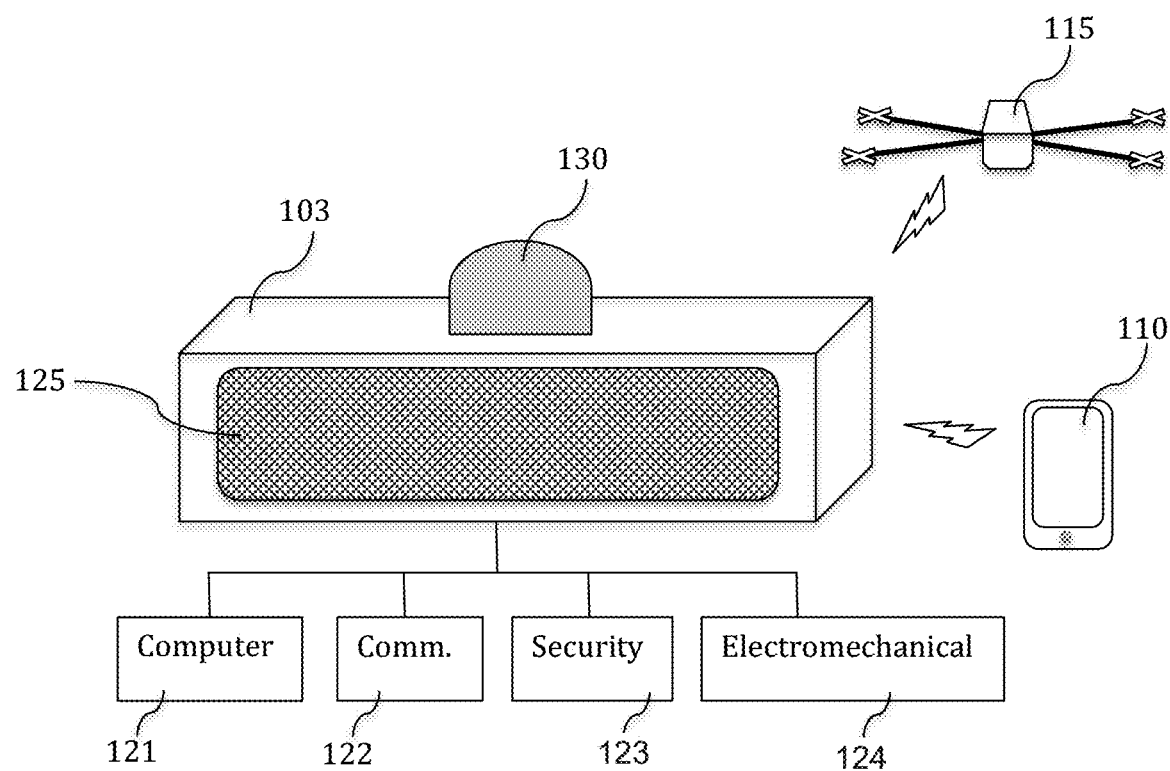
FIG. 3 illustrates a control panel and associated components included with the housing of a system for securing delivered packages, in accordance with features of the embodiments.

Referring to FIG. 3, diagram of the system control unit 103 is further illustrated. A system control unit 103 can include a computer 121, communications components 122, security components 123, and electromechanical control components 124, either within or in association with the system control unit 103, in accordance with additional embodiments, is illustrated. The computer 121 can enable overall control of the electromechanical, security, and communications features of the system 101. The communications components 122 can facilitate wireless communications with a portable handheld device 110, which can typically be carried by a user to deliver to or access packages within the housing 101 by causing the door 102 to unlock and/or open to deliver or retrieve packages in association with the housing 101. The electromechanical control component 124 can facilitate unlocking of the electromechanical locking mechanism associated with the door hardware 104 and the door 102. The communications components 122 can also facilitate wireless communications with authorized personnel near the housing 101, and enable the opening of doors 102. It should also be appreciated that the communications components 122 can facilitate communication over wireless and wired data communications networks 115 (such as satellite and cellular communications services) to access, or to be accessed by, remote systems (e.g., remote servers and operators for messaging or alarm notification).

A user interface 12 can be provided to facilitate a user's (owner/manager of the box) ability to remotely open doors 102 for a third party (e.g., delivery personal) in order to enable access to within the housing 101 for the placement of packages to be securely held within the housing 101. A locking mechanism in association with the system control unit 103 can also unlock the door 102 (or a doors) to the housing 101 directly (e.g., a code, key, RFID, or biometric) and enable a person with access inside the housing 101. The user interface 125 can include a variety of user controls that can be physically accessed by a user to obtain access to within the housing 101, including any combination of: touch-sensitive display screens, biometric readers, key locks, buttons, RFID readers, switches, lights, etc. A pin number, biometric, wirelessly provided signal (RFID code or signal from smartphone/tablet) or regular key can be used to obtain access via the system control unit 103.

Security components 123 can provide sensors and alarms f intrusion is detected. Sensors can include those that provide an indication of an event that is related to motion, thermal, and environmental events. A sensor can also monitor the presence of a package within the housing. Any condition can trigger an alarm at the housing 101. A signal can also be provided to remote alarm monitoring services or a user's remote portable device 110. A 360-degree security camera 130 can also be provided as a security feature to provide a user or remote monitors the ability to view activity around the housing 101.

A service can be provided to operate in association with the system 100 and authorized users (e.g., delivery person) by enabling temporary access via RFID tag, pin number, biometric when the users are is close proximity to the device, or within a short timeframe (delivery window). The communication components 122 can also operate in real-time with a remote service to enable real-time access to the housing 101 once the user is verified/authenticated at the housing 101. As an example, the owner of the system 100 (residential owner with a housing outside their front door) can order product from an online store. At completion of the order, the online store can ask if a secured package deliver/housing is in use at the residence. If the answer is yes, the online service can ask for a pin number from the user (customer). The pin can be used by an assigned delivery person to access the housing. The pin can be activated within the control panel 103 after the order is processed, or when the delivery person is present near the housing based on a determination of proximity. In another exemplary scenario, a customer can accept the service's access the housing upon delivery and the service can transmit a temporary access code of its own directly to the identified housing 101 and control panel 103, either after ordering or on the day of delivery.

It should be appreciated that the system 100 can be utilized by its owner for more than just package delivery. The receipt of items from, associates (e.g., friends) can also be possible when the owner is not at the location with the assignment of temporary pins via a data network and communication with the control panel 103. The 360-degree camera can be used to verify/authenticate third parties that are dropping off or picking up a package or item from the housing 101.

Figure 4:
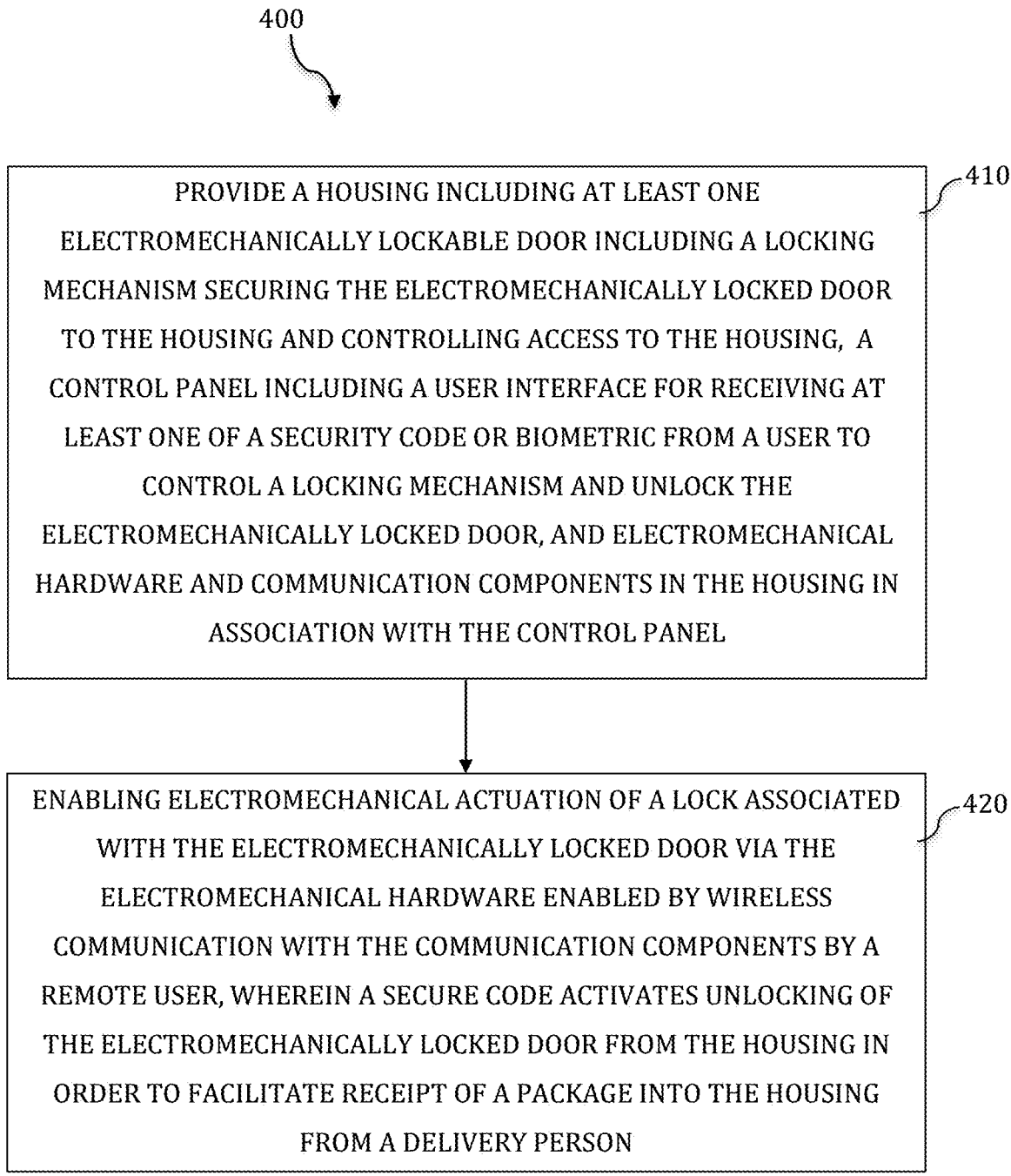
FIG. 4 illustrates a method for securing delivered packages, in accordance with features of the embodiments.

FIG. 4 illustrates a flow diagram of a method 400 of securing delivered packages in accordance with the embodiment. As shown in block 410, a housing including at least one electromechanically lockable door including a locking mechanism securing the electromechanically locked door to the housing and controlling access to the housing, a control panel including a user interface for receiving at least one of a security code or biometric from a user to control a locking mechanism and unlock the electromechanically locked door, and electromechanical hardware and communication components in the housing in association with the control panel is provided. In block 420, electromechanical actuation of a lock associated with the electromechanically locked door is enabled via the electromechanical hardware enabled by wireless communication with the communication components by a remote user, wherein a secure code activates unlocking of the electromechanically locked door from the housing in order to facilitate receipt of a package into the housing from a delivery person.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

The invention claimed is:

1. A system for securing delivered packages, comprising:
   a box including at least four panels configured for placement near a front door outside of a premises;
   at least one electromechanically lockable door including a locking mechanism securing the electromechanically locked door to at least one panel of the box and controlling access to a containment area defined by the at least four panels and the at least one electromechanically lockable door of the box;
   a sensor located in the containment area of the box adapted to monitor the presence of packages in the box; and
   a control panel including a user interface for receiving a security code from an authorized user and a temporary code provided wirelessly to a delivery person detected in close proximity to the box, the security code and the temporary code accepted by the control panel to control a locking mechanism and unlock the electromechanically locked door thereby enabling access to the containment area by the authorized user and delivery person via the lockable door.

2. The system of claim 1, further comprising electromechanical hardware and communication components in the box in association with the control panel.

3. The system of claim 2, wherein electromechanical actuation of a lock for the electromechanically locked door by the electromechanical hardware is further enabled via wireless communication with the communication components by a remote user, wherein a secure code activates unlocking of the electromechanically locked door from the box in order to facilitate receipt of a package into the housing from a delivery person.

4. The system of claim 2, wherein electromechanical actuation of a lock for the electromechanically locked door by the electromechanical hardware is further enabled via wireless communication with the communication components by a remote server in association with a delivery personal when the location services associated with the delivery person indicates to the server that the delivery person is in close proximity to the box.

5. The system of claim 2, wherein the electromechanical hardware and the communication components are powered by a solar-powered and battery rechargeable source.

6. The system of claim 1, wherein the locking mechanism further comprises at least one of a keyed lock, biometrically controlled lock, or a wirelessly actuated lock, wherein the door that can be actuated by a user using at least one of: a key, a biometric provided to a biometric reader, or a signal provided wirelessly to communication components associated with the locking mechanism and the box.

7. The system of claim 1, further comprising a security alarm associated with the box to protect the box and any packages contained therein from tampering or theft.

8. The system of claim 1, wherein the housing further comprises a security alarm adapted to protect the box and any packages contained therein from tampering or theft by wirelessly communicating a signal indicating any anomalies to a remote security monitoring service or system.

9. The system of claim 1, further comprising a 360-degree security camera to monitor, record and/or transmit activity occurring near the box.

10. The system of claim 1, further comprising a 360 degree security camera to monitor, record and/or transmit activity near the box in response to an alarm or detection of activity near the box via sensors.

11. A system for securing delivered packages near a front door of a home, comprising:
    a housing in the shape of a box including at least four panels and configured for placement near a front door of a premises;
    at least one electromechanically lockable door including a locking mechanism securing the electromechanically lockable door to at least one of the panels forming the box and controlling access to a containment area defined by an area within the at least four panels of the box;
    a sensor located in the box adapted to monitor the presence of packages in the box;
    a control panel including a user interface for receiving a security code from an authorized user and a temporary code provided wirelessly to a delivery person detected in close proximity to the box, the security code and the temporary code accepted by the control panel to control a locking mechanism and unlock the electromechanically lockable door thereby enabling access to the containment area by the authorized user and delivery person via the lockable door; and
    electromechanical hardware and communication components in the box in association with the control panel, wherein electromechanical actuation of a lock for the electromechanically lockable door by the electromechanical hardware is further enabled via wireless communication with the communication components by a remote user, wherein a secure code activates unlocking of the door from the box in order to receive and facilitate receipt of a package from a delivery person and removal of the package by the authorized user.

12. The system of claim 11, wherein electromechanical actuation of a lock for the electromechanically locked door by the electromechanical hardware is further enabled via wireless communication with the communication components by a remote server in association with a delivery personal when the location services associated with the delivery person indicates to the server that the delivery person is in close proximity to the box.

13. The system of claim 12, wherein the electromechanical hardware and the communication components are powered by a solar-powered and battery rechargeable source.

14. The system of claim 11, wherein the locking mechanism further comprises at least one of a keyed lock, biometrically controlled lock, or a wirelessly actuated lock, wherein the door that can be actuated by a user using at least one of: a key, a biometric provided to a biometric reader, or a signal provided wirelessly to communication components associated with the locking mechanism and the box.

15. The system of claim 11, wherein the box further comprises a security alarm adapted to protect the box and any packages contained therein from tampering or theft by wirelessly communicating a signal indicating any anomalies to a remote security monitoring service or system.

16. The system of claim 11, further comprising a 360 degree security camera to monitor, record and/or transmit activity near the box in response to an alarm or detection of activity near the box via sensors.

17. A method for securing delivered packages in a box located near a front door of a premises, comprising:
providing a box including at least four panels and including at least one electromechanically lockable door secured to at least one of the panels including a locking mechanism securing the electromechanically locked door to the box and controlling access to the box defining a containment area therein and configured for placement near the front door of the home, a control panel including a user interface for receiving a security code from an authorized user and a temporary code provided wirelessly to a delivery person detected in close proximity to the box, the security code and the temporary code accepted by the control panel to control a locking mechanism and unlock the electromechanically lockable door thereby enabling access to the containment area defined by the box via the lockable door, and electromechanical hardware and communication components in the box in association with the control panel;
enabling electromechanical actuation of a lock associated with the electromechanically locked door via the electromechanical hardware enabled by wireless communication with the communication components by a remote user, wherein a secure code activates unlocking of the electromechanically locked door from the box in order to facilitate receipt of a package into the box from a delivery person and removal of the package by the authorized user.

18. The method of claim 17, wherein electromechanical actuation of a lock for the electromechanically locked door by the electromechanical hardware is further enabled via wireless communication with the communication components by a remote server in association with a delivery personal when the location services associated with the delivery person indicates to the server that the delivery person is in close proximity to the box.

19. The method of claim 17, wherein the locking mechanism further comprises at least one of a keyed lock, biometrically controlled lock, or a wirelessly actuated lock, and wherein the electromechanically locked door is actuated by a user using at least one of: a key, a biometric provided to a biometric reader, or a signal provided wirelessly to communication components associated with the locking mechanism and the box.

20. The method of claim 17, further providing a security alarm in association with the box adapted to protect the box and any packages contained therein from tampering or theft by wirelessly communicating a signal indicating any anomalies to a remote security monitoring service or system, and a 360 degree security camera in association with the box to monitor, record and/or transmit activity near the box in response to an alarm or detection of activity near the box via sensors.

* * * * *